(12) United States Patent
Cooke et al.

(10) Patent No.: US 8,599,637 B2
(45) Date of Patent: *Dec. 3, 2013

(54) ADVANCED DETECTION OF MEMORY DEVICE REMOVAL, AND METHODS, DEVICES AND CONNECTORS

(75) Inventors: James Cooke, Boise, ID (US); Peter Feeley, Boise, ID (US); Victor Tsai, Palo Alto, CA (US); William H. Radke, Los Gatos, CA (US); Neal Galbo, Boca Raton, FL (US); Chad Cobbley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,743

(22) Filed: May 29, 2012

(65) Prior Publication Data

US 2012/0243362 A1    Sep. 27, 2012

Related U.S. Application Data

(63) Continuation of application No. 12/478,422, filed on Jun. 4, 2009, now Pat. No. 8,189,420.

(51) Int. Cl.
*G11C 5/14* (2006.01)
(52) U.S. Cl.
USPC ............................. 365/226; 365/227; 711/115
(58) Field of Classification Search
USPC .................................................. 365/226, 227
See application file for complete search history.

(56) References Cited

U.S. PATENT DOCUMENTS

| 8,189,420 B2 * | 5/2012 | Cooke et al. ................... 365/226 |
| 2005/0268127 A1 * | 12/2005 | Shiba et al. ..................... 713/320 |
| 2009/0106570 A1 | 4/2009 | Yoon |
| 2010/0312965 A1 | 12/2010 | Cooke et al. |

FOREIGN PATENT DOCUMENTS

| JP | 2003-203209 | 7/2003 |
| JP | 2005-329160 | 12/2005 |
| JP | 2006-351438 | 12/2006 |
| KR | 10-2000-0009441 | 2/2000 |
| KR | 10-2006-0076606 | 7/2006 |

OTHER PUBLICATIONS

"International Search Report dated May 18, 2010 regarding Application No. PCT/US2010/035241".
"International Search Report dated Dec. 24, 2010 regarding Application No. PCT/US2010/035241".

* cited by examiner

*Primary Examiner* — Huan Hoang
(74) *Attorney, Agent, or Firm* — Dorsey & Whitney LLP

(57) ABSTRACT

Memory devices, connectors and methods for terminating an operation are provided, including a memory device configured to terminate an internal operation such as a programming or erase operation responsive to receiving a signal during removal of the memory device from a connector, such as a socket. The memory device may be configured to generate the removal signal, such as by including a dedicated removal terminal. The memory card may respond to the signal by terminating a programming or erase operation before power is lost. The removal terminal may have a dimension that is different from a dimension of a power terminal. Alternatively, the connector may be configured to generate a signal that causes a host to terminate programming or erase operations prior to memory card removal, such as by including a switch that is actuated when the memory device moves to a pre-power loss position.

20 Claims, 5 Drawing Sheets

ADVANCED DETECTION OF MEMORY DEVICE REMOVAL, AND METHODS, DEVICES AND CONNECTORS

CROSS REFERENCE TO RELATED APPLICATION(S)

This application is a continuation of U.S. patent application Ser. No. 12/478,422, filed Jun. 4, 2009, U.S. Pat. No. 8,189,420, which application is incorporated herein by reference, in its entirety, for any purpose.

TECHNICAL FIELD

Embodiments of this invention relate to memory devices and/or their connectors, and, more particularly, in some embodiments, to memory devices that are normally packaged for insertion and removal in a host, such as a computer or other electronic device using a removable memory device.

BACKGROUND OF THE INVENTION

Memory devices, particularly non-volatile memory devices like flash memory, are commonly packaged in a manner that makes it relatively easy for users to insert and remove the memory devices from a host, such as host devices or host systems. Examples of memory devices packaged in this manner include SD Cards, Micro SD Cards, Flash Memory Cards, and CE Cards, to name a few. All of these and other memory devices will sometimes be generically referred to herein as "memory cards," which is intended to refer to any memory device that may be installed in or removed from a host by means other than soldering or the like. Such memory cards frequently use flash memory devices, although other types of memory devices may also be packaged in this manner.

Generally, such memory cards are inserted into a socket or other connector so that a plurality of terminals of the memory card make contact with respective terminals of the socket or other connector. Various types of connectors for receiving memory cards are in common use. One conventional connector is basically just a connector into which an edge of a memory card containing terminals is pushed by a user. The card may be held in position in the connector by the friction resulting from the force exerted by the connector terminals against the memory card terminals. The memory card may subsequently be pulled from the connector by the user. These types of connectors are known as "push-pull" connectors because of the manner in which they are installed and removed by a user. Devices using push-pull connectors sometimes include a plunger, lever or other device that may be actuated by a user to at least partially remove the memory card from the connector.

Another type of memory card connector in common use is known as a "push-push" connector. In a push-push connector, the memory card may be pushed into the connector by a user and then released. When released, the memory card may spring back a short distance but may then be latched in the connector. The memory card may be at least partially removed by again pressing in on the memory card, thereby unlatching the memory card from the connector. Once unlatched, the memory card may easily be removed from the connector. Other types of memory card connectors are also used, such as memory cards using a universal serial bus ("USB") connector.

As mentioned above, memory cards frequently use flash memory devices. As is well-known in the art, flash memory devices are non-volatile memory devices that typically use a charge stored on a floating or non-floating gate on each of a large number of transistors to store respective data. The level of the stored charge defines whether the data stored on the transistor is a logic "0" or a logic "1", for example. Conventional, flash memory devices may thus be programmed by placing a specific charge on the floating gates of the transistors. Flash memory cells may be erased by programming all of the memory cells with a specific charge, such as one corresponding to a logic "1."

Insofar as memory cards generally may be removable from a host at any time, it may be possible for a user to remove the memory card while a programming or erase operation is in process. Unfortunately, the removal of power from the memory card during programming or erase may cause data stored in the memory card to be corrupted. This problem has been addressed in various ways. Operating systems, such as various models of Microsoft Windows,® provide a user interface to allow a user to indicate to a host that the user intends to remove the memory card from the host. The operating system may respond to the remove indication by causing the host to apply signals to the memory card that terminate all programming and erase operations. However, it may be possible for a user to remove the memory card without providing an remove indication to the host, thereby possibly corrupting data stored in the memory card.

With the recent advent of multi-level flash memory devices, which may store any of 4 or more different charge levels on each floating gate, for example, the problem of data corruption caused by removing memory cards during erase or programming operations may become even more serious. There is, therefore, a need for a device or method that may reduce the likelihood of data corruption caused by removing memory cards during erase or programming operations or other operations that may occur in memory devices that should be completed before the memory devices are removed.

DETAILED DESCRIPTION

Figure 1:
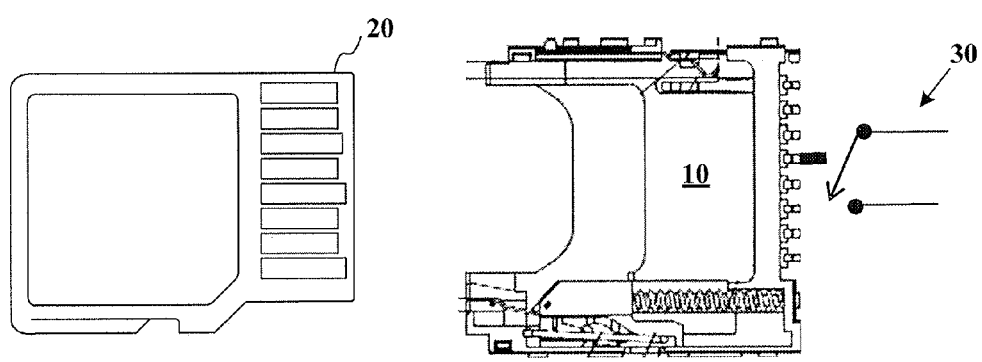
FIG. 1 is a schematic diagram of a memory card connector according to one embodiment.

One embodiment of a memory card connector 10 for receiving a memory card 20 is shown in FIG. 1. In the embodiment shown, the memory card 20 comprises an SD card and the connector 10 comprises an SD card connector, but other memory cards may be used in other embodiments using other types of memory cards and connectors. As is well known in the art, the memory card 20 may be inserted into the connector 10, and ultimately reaches a first position where the memory card may be inserted further against a resilient bias, such as a spring. However, the user may continue to insert the memory card until the card has been completely inserted. When the memory card 20 has been completely inserted, the user may release the memory card 20 to allow the resilient bias to return the memory card 20 to the first position, which latches the memory card 20 in the connector 10.

The memory card 20 may be at least partially removed from the connector 10 using the reverse sequence of operations. Specifically, the memory card 20 may again be pushed into the connector 10 from the first position until it has been fully inserted, and may again be released. The memory card 20 may then spring back, thereby unlatching the memory card 20 in the connector 10. The memory card 20 may then be easily pulled from the connector 10 by the user.

The memory card connector 10 of FIG. 1 further includes a switch 30 that may be normally open, but may be pushed to a closed position when the memory card 20 is fully inserted in the connector before being latched or unlatched. Therefore, the switch 30 will be momentarily closed each time after the memory card 20 is inserted and each time before the memory card 20 is removed. The closing of the switch 30 before the memory card 20 has been removed may generate a high priority interrupt signal for a processor (not shown) or other device to cause the processor or other device to apply appropriate commands to the memory card 20 to immediately terminate any ongoing programming or erase operations. Insofar as power continues to be applied to the memory card 20 for a short period after the switch 30 is closed during removal, the memory card 20 may have sufficient time to respond to the command so that a programming or erase operation has been terminated by the time power may be lost.

Although the memory card connector 10 shown in FIG. 1 uses a normally open, momentarily closed switch to detect that the memory card 20 has been fully inserted, in other embodiments a normally closed, momentarily open switch or some other type of position detector may be used. Also, in other embodiments, the switch 30 may be actuated by a plunger, lever or other device, which, as mentioned above, may be actuated by a user to at least partially remove memory cards from some types of connectors. When the plunger, lever or other device is actuated by a user, the closing of the switch 30 may provide advance notice of impending removal of memory cards from connectors before power is lost.

Figure 2:
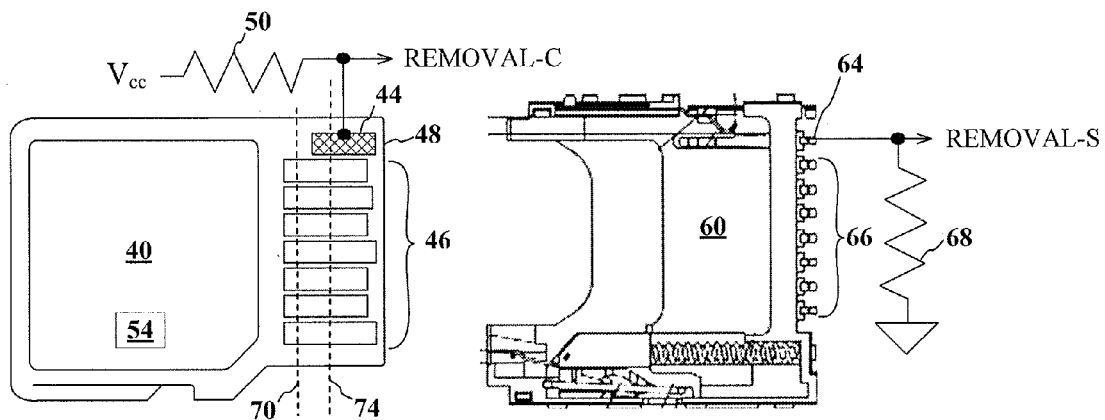
FIG. 2 is a schematic diagram of a memory card and a memory card connector according to an embodiment.

The memory card connector 10 of FIG. 1 may prevent inadvertent loss of data in any standard memory card that may be configured to be used with the connector 10. However, in other embodiments, the memory card may be specially configured to be used with a specially configured connector. For example, as shown in FIG. 2, a memory card 40 is provided with an extra "removal" terminal 44 that is positioned adjacent memory terminals 46 normally provided for the memory card 40. The removal terminal 44 may be shorter than the normal memory terminals 46 so that it does not extend as far from a first edge 48 that is normally first inserted into a connector. The removal terminal 44 may be coupled to a supply voltage Vcc through a resistor 50.

Figure 3:
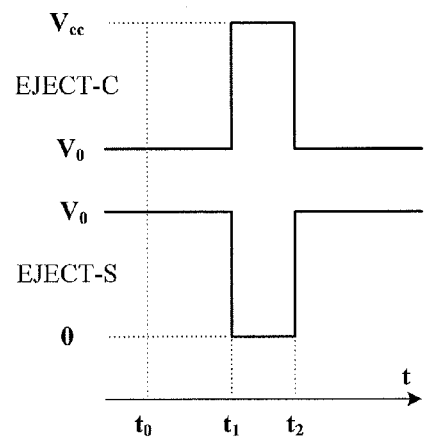
FIG. 3 is a timing diagram showing respective removal signals that may be generated by the memory card and memory card connector of FIG. 2.

The memory card 40 may be configured for use with a connector 60 that includes an extra removal terminal 64 adjacent a set of terminals 66 that normally make contact with the memory terminals 46 of the memory card 40. The removal terminal 64 may be coupled to a particular reference potential, such as ground, through a resistance, such as resistor 68. As is well-known in the art, the terminals 64, 66 are spring loaded against the terminals 44, 46, respectively, and they may contact the respective terminals of the memory card 20 along a relatively narrow length of the respective memory card terminals. When the memory card 40 has been fully inserted into the connector 60, the positions of terminals 64, 66 of the connector 60 relative to the positions of the terminals 44, 46 of the memory card 40 are indicated by the line 70. In this position, the removal terminal 44 of the memory card 40 does not make contact with the removal terminal 64 of the connector 60. As a result, an REMOVAL-C signal provided by the removal terminal 44 of the memory card 40 is at Vcc, and an REMOVAL-S signal provided by the removal terminal 64 of the connector 60 is at ground. However, when the memory card 40 is latched in the connector 60, the position at which the terminals 64, 66 of the connector 60 contact the terminals 44, 46 of the memory card 40 are indicated by the line 74. In this position, the removal terminal 44 of the memory card 40 may contact the removal terminal 64 of the connector 60 so that an REMOVAL-C signal provided by the memory card 40 and an REMOVAL-S signal provided by the connector 60 are at a voltage $V_0$. In the embodiment shown in FIG. 2, the resistance of the resistor 50 may be equal to the resistance of the resistor 68 so that the REMOVAL-C and REMOVAL-S signals are at Vcc/2 when the memory card 40 has been latched. Therefore, when the memory card 40 is being removed from the connector 60, the REMOVAL-C and REMOVAL-S signals are as shown in FIG. 3. Specifically, prior to removing the memory card 40 starting at $t_1$, the REMOVAL-C signal and the REMOVAL-S signal are at Vcc because the terminal 64 of the connector 60 is making contact with the terminal 44 of the memory card 40. However, when the memory card 40 is pushed all the way into the connector 60 to unlatch the memory card 40 from the connector at time $t_1$, the terminal 64 of the connector 60 loses contact with the terminal 44 of the memory card 40. As a result, the REMOVAL-C signal rises to Vcc, and REMOVAL-S signal falls to ground. At $t_2$, the memory card 40 has been unlatched and is removed to the point that the terminal 64 of the connector 60 loses contact with the terminal 44 of the memory card 40. In this position, the REMOVAL-C signal and the REMOVAL-C signal return to $V_0$. The $V_0$ value of the REMOVAL-S signal between $t_1$ and $t_2$ may again generate a high priority interrupt signal for a processor (not shown) or other device in a host to cause the host to apply appropriate commands to the memory card 40 to immediately, and relatively safely, terminate any ongoing program or erase operations. Alternatively, or in addition, the Vcc value of the REMOVAL-C signal between $t_1$ and $t_2$ may be provided to memory circuitry 54 in the memory card 40 which may be operable to immediately terminate all programming or erase operations without waiting for commands from a host. The memory card 40 may then have sufficient time to respond to the REMOVAL-C or commands from the host so that all programming or erase operations have been terminated before power may be lost.

Although the memory card 40 and connector 60 in the embodiment of FIG. 2 use resistors 50, 68 forming a resistor divider network, other circuits may be used in other embodiments, including circuits that do not consume as much power as a resistor divider network.

Figure 4:
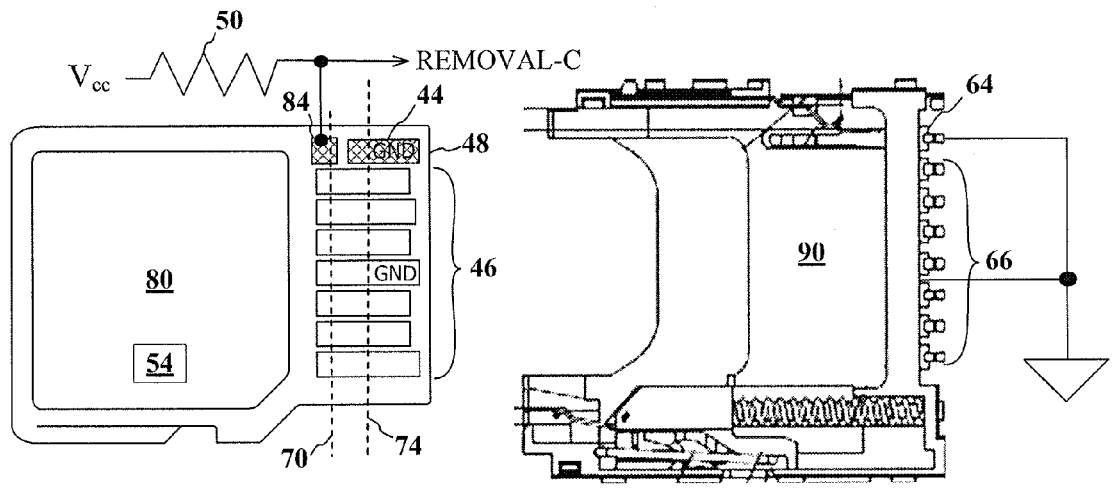
FIG. 4 is a schematic diagram of a memory card and a memory card connector according to another embodiment.

Another embodiment of a memory card 80 and memory card connector 90 is shown in FIG. 4. The memory card 80 and connector 90 are similar to the memory card 40 and connector 60, respectively, shown in FIG. 2. Therefore, in the interest of brevity and clarity, identical components have been provided with the same reference numerals, and an explanation of their structure and operation will not be repeated. The memory card 80 differs from the memory card 40 by including a removal terminal 84 that may be separated from the terminal 44 and by the resistor 50 being coupled to the removal terminal 84 rather than to the terminal 44. Also, the connector 90 differs from the connector 60 by connecting the terminal 64 to ground along with the normal signal ground on one of the terminals 66 rather than by connecting the terminal 64 to ground through a resistor 68 as in the embodiment of FIG. 2.

Figure 5:
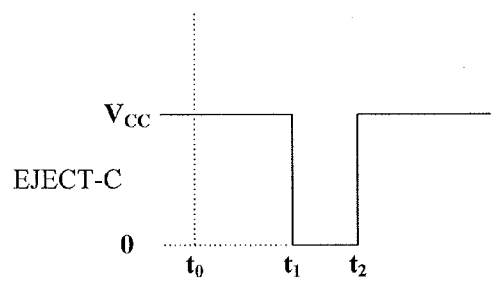
FIG. 5 is a timing diagram showing a removal signal that may be generated by the memory card of FIG. 4.

In operation, when the memory card 80 is latched in the connector 90, the terminals of the connector 90 make contact with the terminals of the memory card 80 along the line 74, as previously explained. In this position, the terminal 64 of the connector 90 makes contact with the terminal 44 of the memory card 80 so that the terminal 44 may be used as an extra circuit ground terminal for the memory card 80. Insofar as the removal terminal 84 may be electrically isolated from the grounded terminal 44, the REMOVAL-C signal remains at Vcc. However, since the terminal 64 of the connector 90 is connected to ground, no REMOVAL-S signal may be provided in this embodiment. When the memory card 80 is pushed all the way into the connector 90 to unlatch the memory card 80, the terminals of the connector 90 make contact with the terminals of the memory card 80 along the line 70. In this position, the removal terminal 84 makes contact with the grounded terminal 64 of the connector, thereby pulling the REMOVAL-C to ground. As the memory card 80 is unlatched and is pulled from the connector 90, the terminal 64 of the connector may lose contact with the removal terminal 84 of the memory card 80 thereby allowing the REMOVAL-C signal to return to Vcc. The REMOVAL-C signal resulting from this operation is shown in FIG. 5. Specifically, the REMOVAL-C signal is at Vcc prior to the connector terminal 64 making contact with the removal terminal 84 of the connector at $t_1$. The REMOVAL-C signal is then pulled to ground until $t_2$ when the connector terminal 64 loses contact with the removal terminal 84. The memory card 80 may be configured to respond to the active low REMOVAL-C signal by immediately terminating any ongoing program or erase operation in the memory card 80, such as in order to prevent inadvertent data loss. Insofar as power continues to be applied to the memory card 80 for a short period, the memory card 80 may have sufficient time to respond so that a programming or erase operation has been terminated by the time power may be lost.

Figure 6:
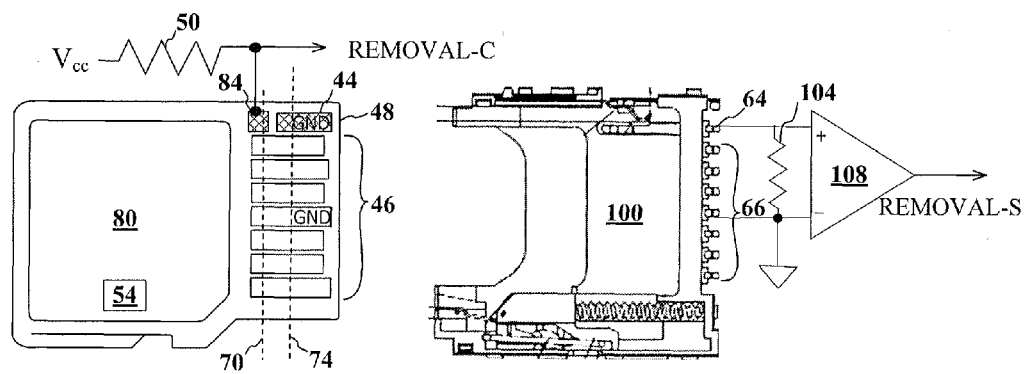
FIG. 6 is another embodiment of a memory card connector that may be used with the memory card of FIG. 4.

Another embodiment of a memory card connector 100 that may be used with the memory card of FIG. 4 is shown in FIG. 6. The connector 100 is identical to the connector 60 shown in FIG. 4, but differs in the circuitry connected to the connector. Specifically, instead of connecting the removal terminal 64 of the connector 100 directly to ground, the terminal 64 may be connected to ground through a resistor 104, and differential inputs of sensing circuitry 108 are connected to opposite ends of the resistor 104. The resistor 104 may have a resistance that may be substantially smaller than the resistance of the resistor 50. Therefore, when the memory card 80 has been fully inserted in the connector 100 so that the secondary removal terminal 84 may be in contact with the removal terminal 64, the memory card 80 acts essentially as a current source. The current source by the memory card 80 flowing through the resistor 104 generates a small differential voltage that may be sensed by the sensing circuitry 108 to provide an REMOVAL-S signal to a host so it may apply appropriate signals to the memory card 80. Of course, the memory card 80 receives the active low REMOVAL-C signal, which it allows it to immediately terminate any ongoing program or erase operations. The use of a resistor 104 having a resistance that may be substantially smaller than the resistance of the resistor 50 may have the added advantage of maintaining the removal terminal 44 at substantially zero volts so that the terminal 44 may serve as an extra ground terminal for the memory card 80. Thus, like the connector 90, the connector 100 provides the advantage of an extra ground terminal, but may also provide an REMOVAL-S signal to the host. As explained above, the REMOVAL-S signal may be used to generate a high priority interrupt signal for a processor (not shown) or other device in a host to cause the host to apply appropriate commands to the memory card 80 to immediately, and relatively safely, terminate any ongoing program or erase operations. Alternatively, or in addition, the REMOVAL-C signal may be provided to the memory circuitry 54 in the memory card 80 which may be operable to immediately terminate all programming or erase operations without waiting for commands from a host. Insofar as power continues to be applied to the memory card 80 for a short period, the memory card 80 may have sufficient time to respond to commands so that a programming or erase operation has been terminated by the time power may be lost.

Figure 7:
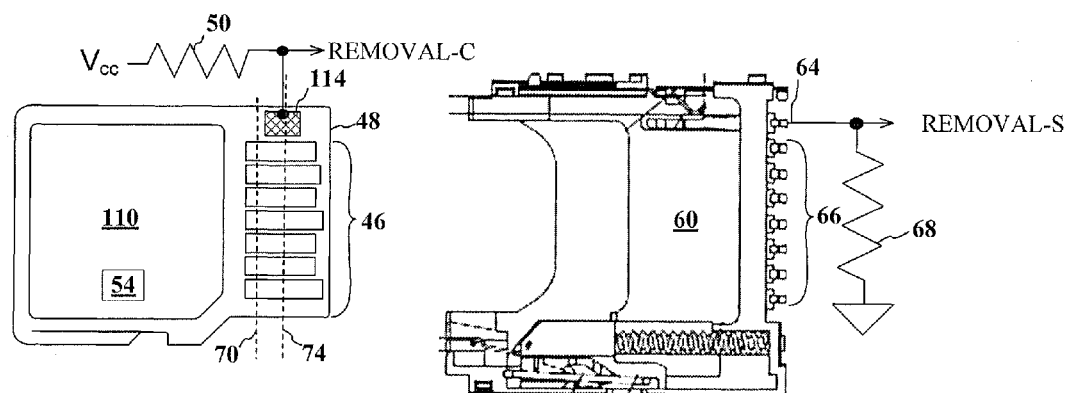
FIG. 7 is another embodiment of a memory card that may be used with the memory card connector of FIG. 2.

Another embodiment of a memory card 110 that may be used with the memory card connector 60 of FIG. 2 is shown in FIG. 7. The memory card 110 uses many of the same components as the memory card 40 of FIG. 2, which have been provided with the same reference numerals. The memory card 110 differs from the memory card 40 of FIG. 2 by using an removal terminal 114 having a length that may be substantially shorter than the length of the removal terminal 44 of the memory card 80. In operation, the memory card 110 operates in the same manner as the memory card 40 when used with a push-push memory card connector, like the memory card connector 60. However, the memory card 110 may also provide advance notice of removal for push-pull memory card connectors, which, as explained above, are simply a connector into which the memory card may be pushed and from which it may be pulled. When the memory card 110 is pulled from the connector of a push-pull connector, the removal terminal 114 loses contact with the connector removal terminal 64 before the power and ground are lost through the memory terminals 46. As a result, the REMOVAL-C signal transitions from whatever voltage is created by the resistor divider formed by the resistors 50, 68 to Vcc, thereby allowing the memory card 110 to attempt to terminate substantially immediately any ongoing program or erase operations before power and ground are lost in the memory card 110. Again, the REMOVAL-S signal may be used to generate a high priority interrupt signal to cause a host to apply appropriate commands to the memory card 110 to immediately, and relatively safely, terminate any ongoing program or erase operations. Alternatively, or in addition, the circuitry 54 in the memory card 110 may be configured to respond to the active low REMOVAL-C signal by immediately terminating any ongoing program or erase operation in the memory card 110 in order to prevent inadvertent data loss. Insofar as power continues to be applied to the memory card 110 for a short period, the memory card 110 may have sufficient time to respond to commands so that a programming or erase operation has been terminated by the time power may be lost.

Figure 8:
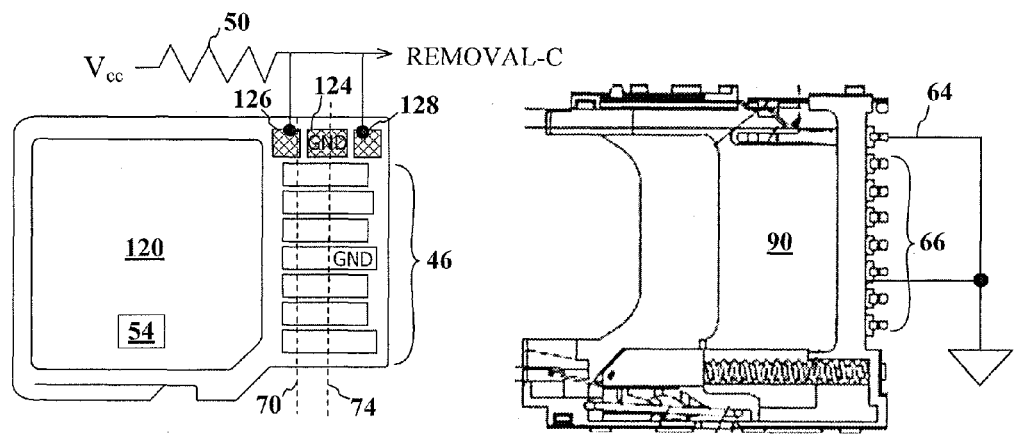
FIG. 8 is another embodiment of a memory card that may be used with the memory card connector of FIG. 4.

Another embodiment of a memory card 120 that may be used with the connector 90 of FIG. 4 is shown in FIG. 8. Like the memory card 80, the memory card 120 uses a first removal terminal 124 and a second removal terminal 126. However, the first removal terminal 124 has a length that may be substantially shorter than the length of the removal terminal 44, and a third removal terminal 128 may be provided. Both the second and third removal terminals 126, 128, respectively, are coupled to Vcc through the resistor 50. Again, the memory card 120 operates in exactly the same manner as the memory card 80 in the embodiment of FIG. 4 when used with a push-push memory card connector, like the memory card connector 90. However, the memory card 120, like the memory card 110 of FIG. 7, may provide advance notice of removal when used in a push-pull connector. When the memory card 120 is inserted in a connector of a push-pull connector, the terminals of the connector make contact with the removal terminal 124 and the other memory terminals 46 of the memory card 120 all along the line 74. However, as the memory card 120 is pulled from the connector of the push-pull connector, the removal terminal of the connector loses contact with the primary removal terminal 124 and instead makes contact with the third removal terminal 128. The REMOVAL-C signal provided to the memory card 120 then transitions from Vcc to ground. The REMOVAL-C signal thus has the same characteristics as when the memory card 120 is being removed from a push-push connector to cause the second removal terminal 126 to make contact with the terminal 64 of the connector 90. As with other embodiments, the circuitry 54 in the memory card 110 may be configured to respond to the active low REMOVAL-C signal by immediately terminating any ongoing program or erase operation in the memory card 110 in order to prevent inadvertent data loss. As a result, programming and erase operations may be terminated before power has been lost from the memory card 120.

Although the memory card 120 has been explained in the context of being inserted in a push-push connector like the connector 90, it may also be used with other types of push-push connectors as well as push-pull connectors. For example, the memory card 120 may be used with the connector 100 of FIG. 6 since, as far as operation in a push-push connector is concerned, the memory card 120 may be identical to the memory card 80. In such case, the connector 100 provides the REMOVAL-S signal at the same time that the memory card 80 provides the REMOVAL-C signal, as explained above with reference to FIG. 6. Although the memory card 40 and connector 60 in the embodiment of FIG. 2 use resistors 50, 68 forming a resistor divider network, other circuits may be used in other embodiments, including circuits that do not consume as much power as a resistor divider network. However, the resistor divider network used in the embodiment of FIG. 2 only consumes power for only a short period during memory card removal.

Figure 9:
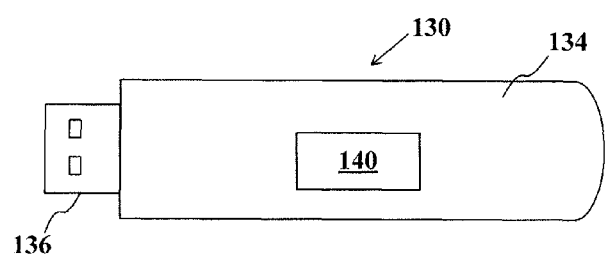
FIG. 9 is an embodiment of a memory device that may provide advance notice of removal from a host.

Another embodiment of a memory device 130 that may provide advance notice of removal from a host is shown in FIG. 9. The memory device may be in the form of a familiar nonvolatile memory device sometimes known as a "USB drive," which includes a housing 134 having a universal serial bus ("USB") connector 136 projecting from the housing 134. However, the embodiment may also be applicable to other types of removable memory devices, such as SD memory cards. The device 130 may also include a detector 140 that may sense when the device 130 is about to be removed from a host, such as a personal computer or other electronic device. In one embodiment, the detector 140 may be an externally sensitive capacitive detector, such as one in which the capacitance between capacitor plates may be altered when a user grasps the memory device 130. In other embodiments, the detector 140 may be a mechanical force detector, such as one that senses pressure applied to the housing 134 by a user before removing the memory device 130 from a host. In still other embodiments, the detector 140 may be an externally optical detector, such as one that senses a change in the intensity or other characteristics of ambient light as the housing 134 is grasped by a user. Other embodiments may use other types of detectors.

Although the present invention has been described with reference to the disclosed embodiments, persons skilled in the art will recognize that changes may be made in form and detail without departing from the invention. For example, the removal terminals in the various embodiments of a memory card have dimensions in a first direction that is perpendicular to the edge of the card that are different from dimensions of other terminals in the first direction. However, in other embodiments, a removal terminal of a memory card may be identical to other terminals of the memory card. Instead, a point of contact between a removal terminal of the connector and the removal terminal of the memory device may be offset in the first direction from respective points of contact between other terminals of the connector and corresponding terminals of the memory device. Such modifications are well within the skill of those ordinarily skilled in the art. Accordingly, the invention is not limited except as by the appended claims.

We claim:
1. A connector comprising:
a plurality of memory terminals; and
a memory removal detector configured to generate a signal before a memory has been removed from the connector, wherein the memory detector comprises:
at least one removal terminal; and
a differential amplifier having respective first and second differential inputs coupled across a resistance.
2. The connector of claim 1 wherein the resistance comprises a first resistance, and the memory removal detector further comprises a second resistance, wherein the second resistance is coupled between the at least one removal terminal and a voltage.
3. The connector of claim 2 wherein the first resistance is substantially smaller than the second resistance.
4. The connector of claim 3 wherein the at least one removal terminal voltage being substantially zero.
5. The connector of claim 4 wherein the at least one removal terminal provides an additional ground terminal for the memory.
6. A connector comprising:
an electrical power terminal; and
a memory removal detector configured to detect movement of a memory while the electrical power terminal is connected to a power source and provide a removal signal responsive to the movement of the memory and in advance of removal of the memory from the connector.
7. The connector of claim 6 further comprising memory circuitry, wherein the memory circuitry is configured to halt an operation responsive, at least in part, to the removal signal.
8. The connector of claim 7 wherein the operation is a programming or erase operation.
9. The connector of claim 7 wherein the operation is halted in the memory.
10. The connector of claim 7 wherein the operation is halted in a connected processor or host.
11. The connector of claim 6 wherein the memory removal detector is configured to detect the movement of the memory based at least in part on a state of contact between a removal terminal of the memory and the electrical power terminal.
12. The connector of claim 6 wherein the memory removal detector includes a switch, and the memory removal detector is configured to detect the movement of the memory based at least in part on the switch being closed by the movement of the memory.

13. The connector of claim 6 wherein the removal signal is a high priority interrupt signal.

14. A connector, comprising:
   a plurality of memory terminals; and
   a memory removal detector configured to generate a signal before a memory has been removed from the connector, wherein the memory detector comprises:
      at least one removal terminal;
      a first resistance coupled between the at least one removal terminal and a voltage; and
      a second resistance coupled between the at least one removal terminal and a reference potential.

15. The connector of claim 14 wherein the reference potential is ground.

16. The connector of claim 14 wherein the first resistance and the second resistance are equal.

17. The connector of claim 14 wherein the first and second resistance form a resistor divider network.

18. The connector of claim 14 wherein the at least one removal terminal is shorter than the plurality of memory terminals.

19. The connector of claim 14 wherein the signal is provided to memory circuitry in the memory to immediately terminate all operations without waiting for commands from a host.

20. The connector of claim 19 wherein the operations comprise program or erase operations.

\* \* \* \* \*